(12) United States Patent
Bothwell et al.

(10) Patent No.: US 10,386,858 B2
(45) Date of Patent: Aug. 20, 2019

(54) SYSTEM AND METHOD FOR ROTORCRAFT ACTIVE LATERAL SHUFFLE FILTER

(71) Applicant: Bell Helicopter Textron Inc., Fort Worth, TX (US)

(72) Inventors: Christopher Mike Bothwell, Grapevine, TX (US); Jillian Samantha Alfred, Ft. Worth, TX (US); Sung Kyun Kim, Bedford, TX (US); Marko Vuga, Arlington, TX (US); Matthew Hendricks, Grand Prairie, TX (US); Mark Wasikowski, Keller, TX (US); Thomas Parham, Colleyville, TX (US); Michael Reaugh Smith, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 223 days.

(21) Appl. No.: 15/594,393

(22) Filed: May 12, 2017

(65) Prior Publication Data
US 2018/0329430 A1 Nov. 15, 2018

(51) Int. Cl.
| | | |
|---|---|---|
| G05D 1/08 | (2006.01) |
| B64C 27/82 | (2006.01) |
| B64C 27/04 | (2006.01) |
| B64C 27/57 | (2006.01) |
| B64C 27/00 | (2006.01) |

(52) U.S. Cl.
CPC ......... *G05D 1/0858* (2013.01); *B64C 27/001* (2013.01); *B64C 27/04* (2013.01); *B64C 27/57* (2013.01); *B64C 27/82* (2013.01); *G05D 1/0825* (2013.01)

(58) Field of Classification Search
CPC .... G05D 1/0858; G05D 1/0825; B64C 27/04; B64C 27/82; B64C 27/57; B64C 27/001; B64C 13/50
See application file for complete search history.

(56) References Cited

U.S. PATENT DOCUMENTS

| 5,816,533 A | 10/1998 | Krysinsky |
|---|---|---|
| 7,451,949 B2 | 11/2008 | Eglin |
| 2007/0001052 A1 | 1/2007 | Strehlow et al. |
| 2008/0173754 A1 | 7/2008 | Strehlow et al. |
| 2013/0282205 A1 | 10/2013 | Bailly et al. |

FOREIGN PATENT DOCUMENTS

EP 2687440 A1 1/2014

*Primary Examiner* — Anne M Antonucci
(74) *Attorney, Agent, or Firm* — Slater Matsil, LLP

(57) ABSTRACT

In accordance with an embodiment of the present invention, a method of operating a rotorcraft includes receiving a measured yaw rate from a yaw rate sensor or a measured lateral acceleration from a lateral acceleration sensor of the rotorcraft, filtering the measured yaw rate or the measured lateral acceleration using a filter to form a filtered measured yaw rate or a filtered measured lateral acceleration, and regulating a yaw rate or a lateral acceleration of the rotorcraft based on the measured yaw rate or the measured lateral acceleration. The filter includes a bandpass characteristic or a notch characteristic, and the filtering is configured to reduce lateral vibrations caused by airflow in a tail section of the rotorcraft.

21 Claims, 6 Drawing Sheets

SYSTEM AND METHOD FOR ROTORCRAFT ACTIVE LATERAL SHUFFLE FILTER

TECHNICAL FIELD

The present invention relates generally to a system and method for a flight control, and, in particular embodiments, to a system and method for a rotorcraft active lateral shuffle filter.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower due, in part, to the increased complexity of controlling and stabilizing a rotorcraft. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he or she flies.

SUMMARY

In accordance with a preferred embodiment of the present invention, a method of operating a rotorcraft includes receiving a measured yaw rate from a yaw rate sensor or a measured lateral acceleration from a lateral acceleration sensor of the rotorcraft, filtering the measured yaw rate or the measured lateral acceleration using a filter to form a filtered measured yaw rate or a filtered measured lateral acceleration, and regulating a yaw rate or a lateral acceleration of the rotorcraft based on the measured yaw rate or the measured lateral acceleration. The filter includes a bandpass characteristic or a notch characteristic, and the filtering is configured to reduce lateral vibrations caused by airflow in a tail section of the rotorcraft.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
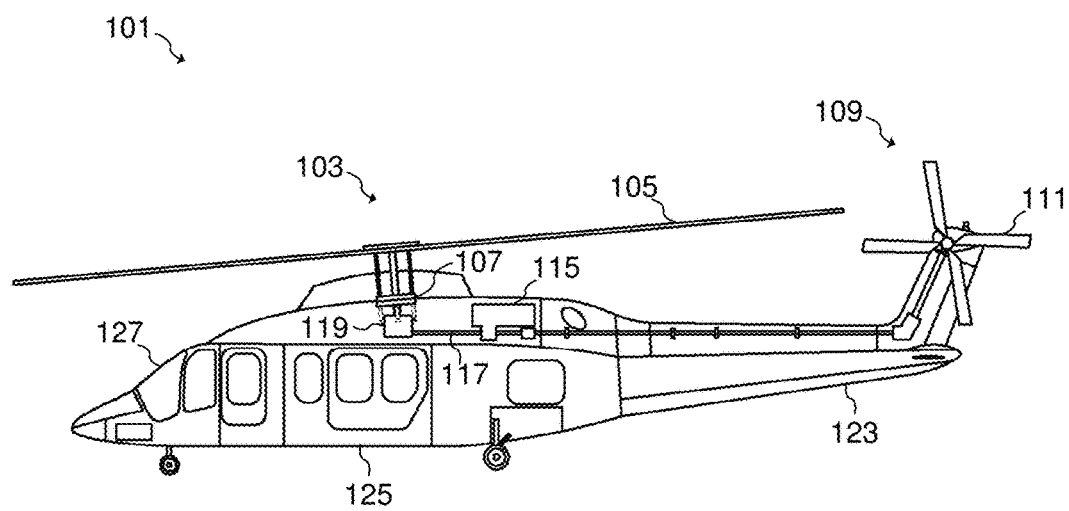
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce the workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to input flight commands in addition to the stabilization inputs automatically provided by the FBW system. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to provide some level of manual control to the flight, the cyclic stick is positioned to reflect the actual cyclic settings.

One issue that may affect the flight performance of a rotorcraft is mechanical vibration caused by the interaction of air flow and rotorcraft during flight. One example of such an interaction is a lateral vibration or shuffle in the tail section of a rotorcraft that occurs when the rotorcraft travels at higher speeds. As the rotorcraft travels, the rotorcraft may shake back and forth in the lateral direction at a frequency of between 4 Hz and 8 Hz when the air flow hits tail section 123 underneath the main rotor 103 and bounces off the various surfaces of tail section 123. The actual frequency and amplitude of these vibrations may depend, for example, on the speed and orientation of the rotorcraft, the load being carried by the rotorcraft, and atmospheric conditions.

In an embodiment of the present invention, a fly-by-wire flight control system is used to reduce or eliminate this lateral vibration of the tail section by applying a bandpass or notch filter function to a sensor feedback signal that represents motion in the axis of sensed vibration. This sensor feedback signal may be produced, for example, by an inertial sensor such as an accelerometer or a gyroscope. In embodiments in which a bandpass filter function is applied, the loop gain of the flight control system can be increased at the frequency of vibration in order to attenuate the amplitude of the vibration. On the other hand, in embodiments in which a notch filter function is applied, overcompensation of the lateral vibration is avoided by attenuating the sensed lateral vibration, thereby leading to reduced vibration. In further embodiments, filter parameters that define the characteristics of the filter may be loaded into the filter on the fly without having to recompile the flight control software.

By suppressing lateral vibrations, smoother and more comfortable flight characteristics may be achieved. Moreover, by lowering such vibrations using a fly-by-wire flight control system, vibration issues may be addressed via the control system without having to physically redesign or retrofit the aircraft with vibration suppressing structures. Also, by using a fly-by-wire system to suppress mechanical vibrations for rotorcraft, smaller, lighter and more agile flight structures may be used to build a rotorcraft than are traditionally used in a non-fly-by-wire rotorcraft.

While embodiments of the present disclosure will be described with respect to preferred embodiments in a specific context, namely a system and method for filtering a yaw channel in a rotorcraft, it should be understood that embodiment principles can be applied to other axes of the rotorcraft as well.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude, and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control the flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize the flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
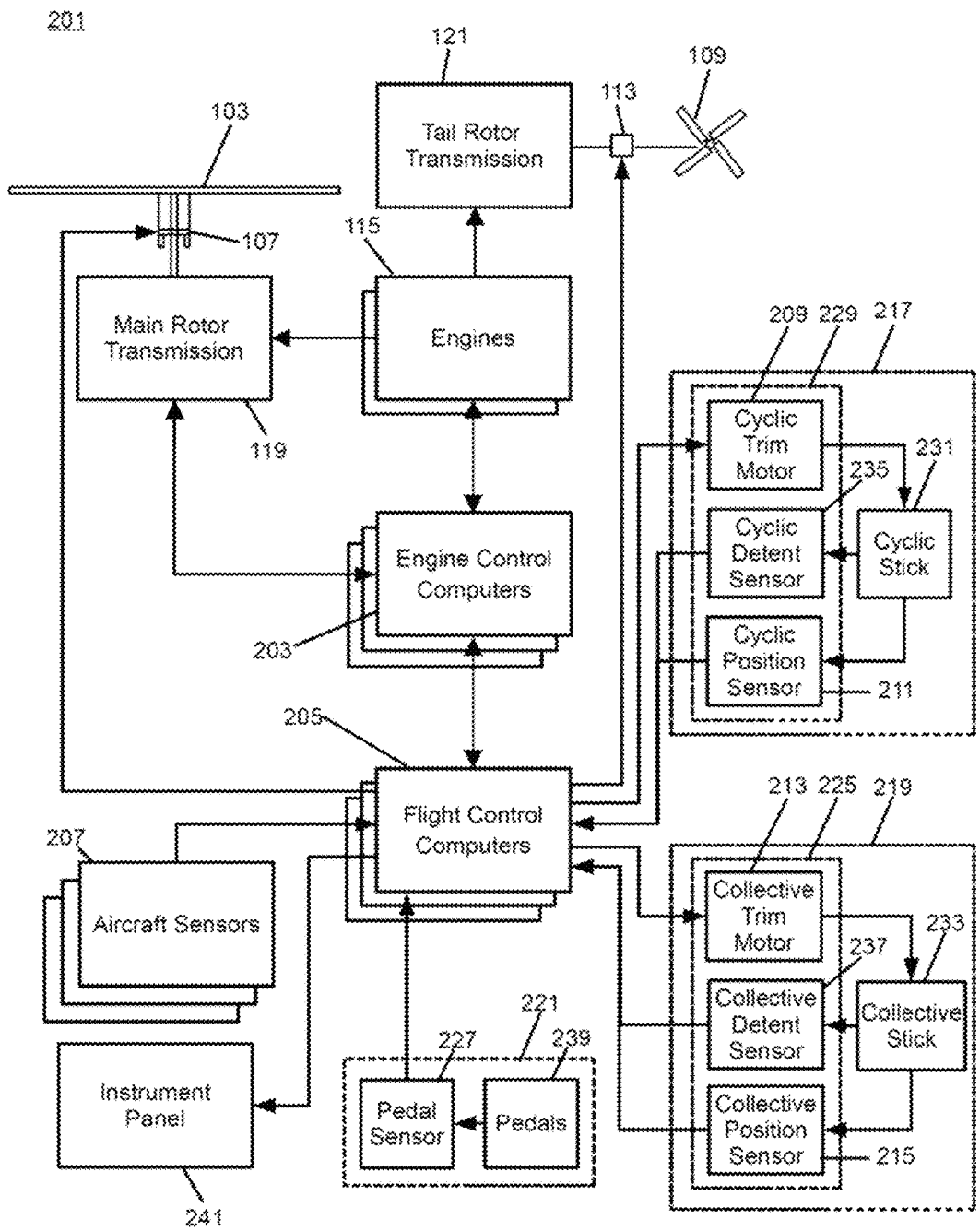
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control the flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce the workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or another tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
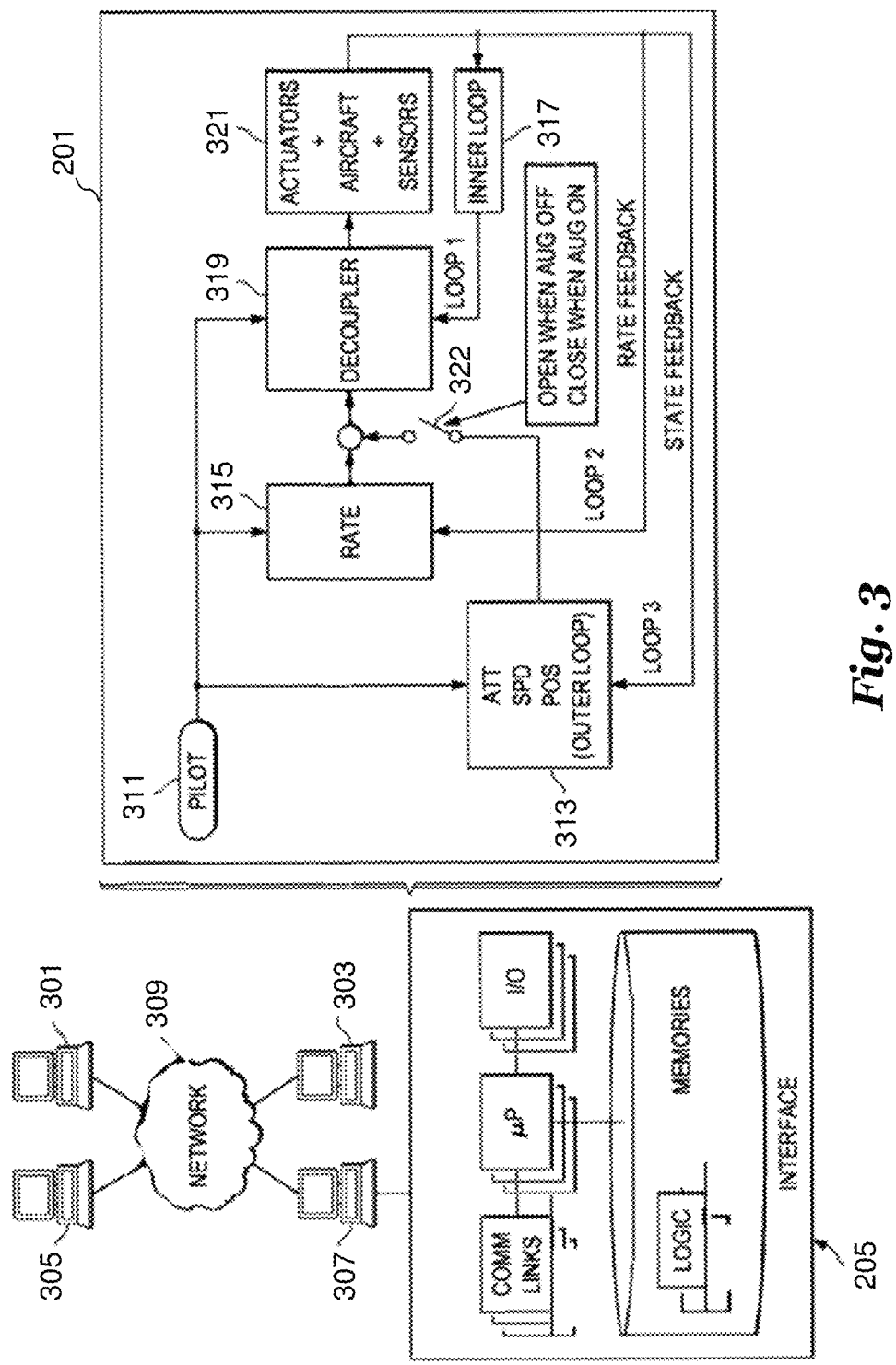
FIG. 3 illustrates a block diagram of an embodiment flight control system.

Moving now to the operational aspects of flight control system 201, FIG. 3 illustrates in a highly schematic fashion, a manner in which flight control system 201 may implement FBW functions as a series of interrelated feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

Figure 4:
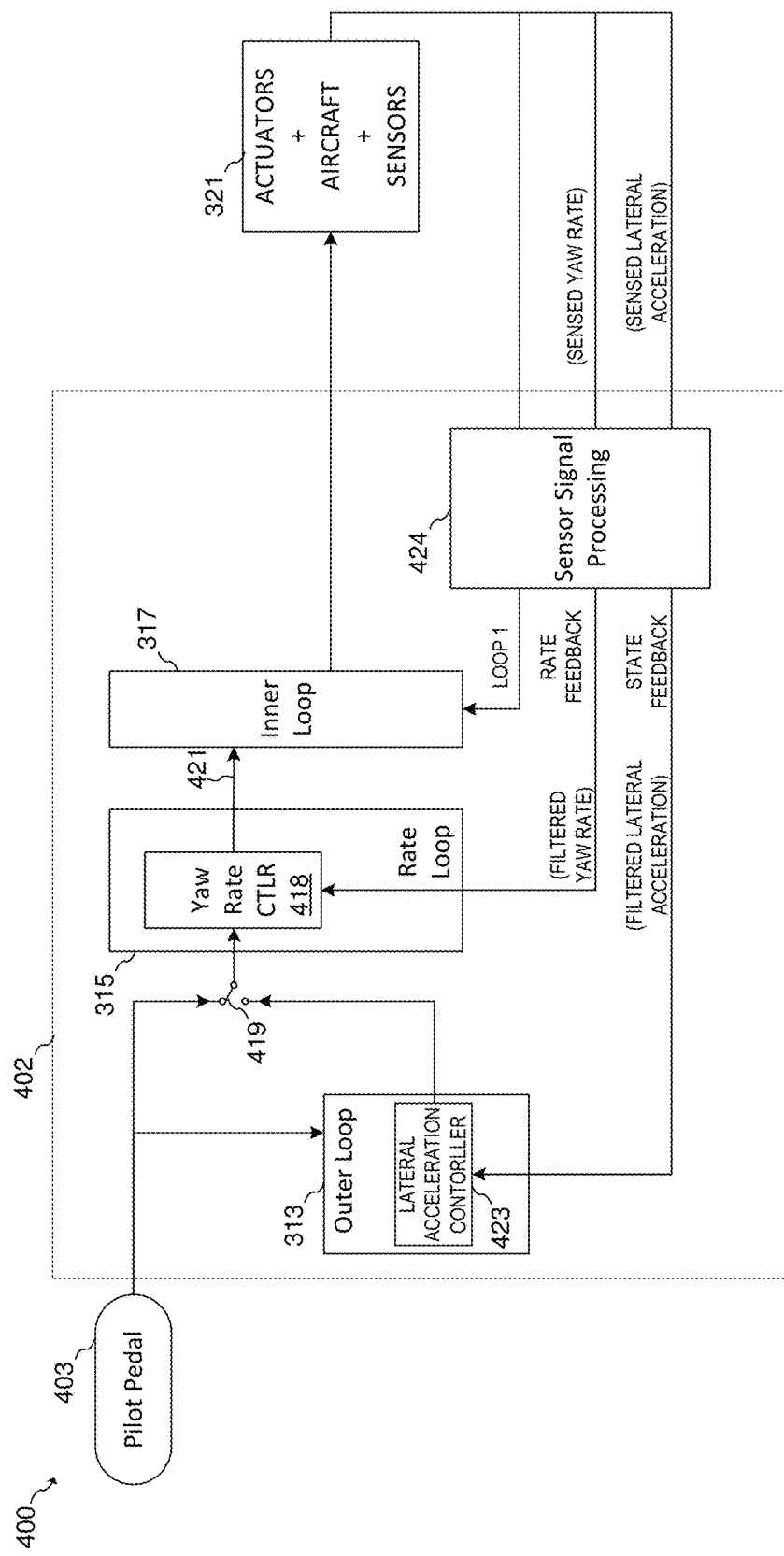
FIG. 4 illustrates a block diagram of a yaw channel of an embodiment flight control system.

FIG. 4 illustrates a flight control system 400 according to an embodiment of the present invention. Pilot pedal block 403 represents, for example, the pedal assembly 221 of the rotorcraft described above in FIG. 2. As shown, pilot pedal block 403 interfaces to flight controller 402. In various embodiments, flight controller 402 is implemented by flight control computer 205, or other processing hardware. Flight controller 402 also interfaces with and controls aircraft equipment 321 representing various actuators, sensors, and the physical body of the rotorcraft. In various embodiments, flight controller 402 controls aircraft equipment 321 using three loops: an inner loop 317; a rate feedback loop 315 that includes yaw rate controller 418; and an outer loop 313. The inner loop 317 stabilizes the dynamics of the rotorcraft, the rate feedback loop 315 controls the angular rates of the rotorcraft, and the outer loop 317 provides control signals to the rate loops to effect a desired attitude, speed and position of the rotorcraft depending on whether or not the pilot is in the loop. In some embodiments, the outer loop 313 supports and provides flight augmentation or auto-pilot functionality, which may be manually disabled or automatically disabled based on flight and system conditions. The inner loop 317 and rate feedback loops, on the other hand, remain operational to provide stability to the rotorcraft.

For purposes of illustration, flight controller 402 is illustrated with respect to the general control blocks that affect the yaw rate of an embodiment rotorcraft. It should be understood that flight controller 402 may also include other controllers and control paths that affect the pitch rate, roll rate and other states of the rotorcraft in addition to the yaw rate. In various embodiments, the yaw rate of the rotorcraft can be controlled by pilot pedal block 403 via yaw rate controller 418. Yaw rate controller 418 compares the yaw rate command produced by pilot pedal block 403 or outer loop 313 with a yaw rate feedback signal generated by an inertial sensor within aircraft equipment 321, and produces an output signal 421 that is processed by inner loop 317. In some embodiments, output signal 421 is based on an error signal produced by subtracting yaw rate feedback from a yaw rate command produced by pilot pedal 403 or by outer loop 313. Inner loop 317 produces an actuator command directed to tail rotor actuator that changes a pitch of tail rotor blades in of tail rotor 109. This change in pitch of rotor blades 111 causes a lateral motion, or yaw, about a vertical axis. Yaw rate controller 418, and inner loop controller 317 may be implemented using flight control algorithms known in the art.

As shown, the input to yaw rate controller 418 is selected from among the output of pilot pedal block 403 and the yaw rate command generated by outer loop 313 via switch 419. In some embodiments, this yaw rate command produced by outer loop 313 is generated by a lateral acceleration controller 423 of outer loop 313. The output of pilot pedal block 403 is selected when the pilot pedal is out of detent and the yaw rate command generated by outer loop 313 is selected when the pilot pedal is in detent. Thus, yaw rate controller 418 processes pilot commands when the pilot is in the loop and processes commands emanating from outer loop 313 when the pilot is not in the loop. It should be understood that switch 419 is representative of a selection between pilot control generated control signals and outer loop 313 generated control signals. Thus, the function of switch 419 may be implemented as a selection routine in software.

In various embodiments, sensor signal processing block 424 receives data from the various sensors of aircraft equipment 321, and conditions and reformats the data for use by the various control loops of flight controller 402. In an embodiment, of the present invention, sensor signal processing block also applies a bandpass filter function or notch filter function to a sensed yaw rate from an inertial sensor to produce a filtered yaw rate. Sensor signal processing block 424 may also apply a bandpass filter function or notch filter function to a sensed lateral acceleration from the inertial sensor to produce a filtered lateral acceleration. In some embodiments, lateral acceleration controller 423 produces the yaw rate command based on a desired yaw rate and the filtered lateral acceleration. The bandpass filter function or notch filter function has a passband or a stopband that includes the lateral vibration or shuffle frequency of the rotorcraft. In embodiments that utilize a bandpass function, the extra loop gain provided by the bandpass function at the vibration frequency creates a larger reaction from the yaw rate controller or lateral acceleration controller, which produces a larger output actuator command, thereby attenuating the vibration in the yaw axis or lateral direction of the rotorcraft. For embodiments that utilize a notch filter, overcompensation of the lateral vibration is prevented by suppressing yaw feedback or lateral acceleration feedback at the lateral vibration or shuffle frequency of the rotorcraft. The selection of which type of filter function to use, as well as peak response of the bandpass filter or the depth of the notch of the notch filter may be selected according to the particular characteristics of the rotorcraft as well as the particular flight environment. In some embodiments, the characteristics of the filter may be varied according to a particular flight profile or mode of operation. For example, in some embodiments, the frequency of the passband or notch may be shifted lower, or the filter may be turned-off when the rotorcraft is on the ground due to changed boundary conditions.

In some embodiments, sensor signal processing block 424 may apply embodiment notch filtering or bandpass filtering only to the sensed yaw rate via yaw rate controller 418, only to the sensed lateral acceleration via lateral acceleration controller 423, or to both the sensed yaw rate and lateral acceleration via yaw rate controller 418 and lateral acceleration controller 423 depending on the specific embodiment and its specifications.

Figure 5:
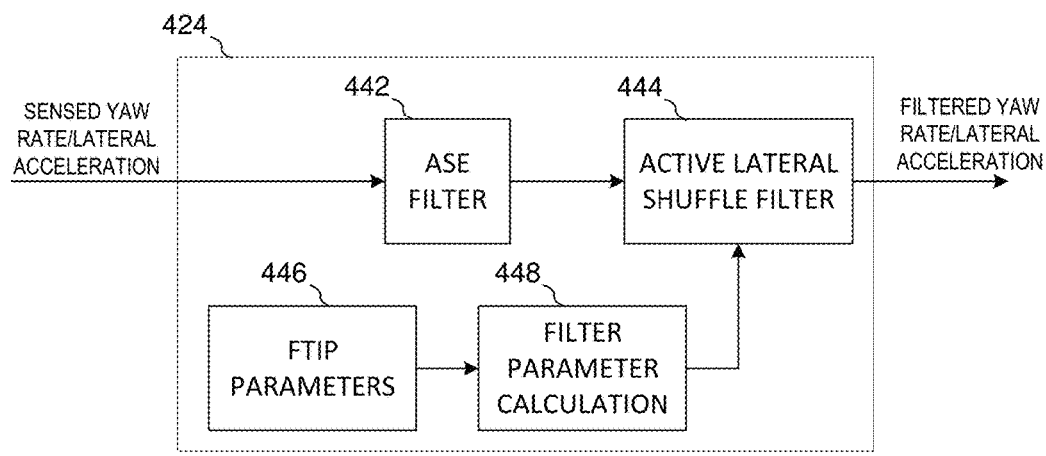
FIG. 5 illustrates a block diagram of an embodiment sensor signal processor.

FIG. 5 illustrates a block diagram of a filter channel of sensor signal processing block 424 that can be used to filter the sensed yaw rate or the sensed lateral acceleration. It should be understood that sensor signal processing block 242 may provide sensor signal processing for other signal paths besides yaw rate or lateral acceleration feedback. For example, sensor signal processing block 424 may also process sensor signals that represent motion on the pitch and roll axes, as well as speed and position of the rotorcraft; however, blocks representing the processing of pitch, roll, speed and position sensor feedback is not shown in FIG. 5 for ease of illustration.

As shown, the filter channel processing path includes Aeroservoelastic (ASE) filter 442 and active lateral shuffle filter 444. ASE filter 442 provides filtering to prevent the excitation of structural modes within the rotorcraft and may include, for example, notch filters configured to dampen possibilities of interaction between the control system and the airframe at a certain frequency. The design of the ASE filter 442 is specific to the rotorcraft and may be designed according to ASE filter design techniques known in the art.

Active lateral shuffle filter 444 includes an embodiment notch filter or bandpass filter that may be used to reduce the amplitude of lateral vibration of the tail section 123 of the rotorcraft. In various embodiments, the frequency of the passband or stopband of lateral shuffle filter 444 is configured to be at a different frequency from the frequencies of the airframe modes targeted in ASE filter 442.

In some embodiments, the rotorcraft has a flight test interface panel (FTIP) that provides the ability to pass FTIP parameters 446 to flight control software running on FCCs 205, which provides a level of flight test functionality. In one example, the FTIP resides in the cockpit of the rotorcraft and is implemented using a laptop computer or tablet PC that interfaces to each FCC 205. Accordingly, the FTIP provides the ability to quickly modify variables used by flight controller 402 without having to reload or recompile the flight software. In some embodiments, some variables may be adjustable in real time when the flight software is active and the rotorcraft is flying. In the example illustrated in FIG. 5, filter parameters associated with active lateral shuffle filter 444 can be provided by the FTIP and changed during flight testing. In one example, FTIP parameters 446 include general filter specifications such as frequency, bandwidth/notch width, notch depth and sampling rate. These general filter specifications are provided to filter parameter calculation block 448 that calculates filter constants used to implement active lateral shuffle filter 444.

In one specific example of how filter calculation block 448 determines filter parameters for a second order continuous time filter having the following transfer function:

$$H(s) = \frac{s^2 + \frac{\omega}{v} + \omega^2}{s^2 + \frac{d\omega}{v}s + \omega^2},$$

where $\omega$ is the desired center frequency in radians per second, $v$ is the desired notch width or passband width in radians per second, $d$ is the desired notch depth or bandpass peak and $T$ is the time step in seconds. In one specific example, the following transfer function $H(s)$ is derived for $\omega = 7 \times 2 \times \pi$, $v=1.5$, $d=0.2$ and $T=0.02$:

$$H(s) = \frac{s^2 + 29.32s + 1934}{s^2 + 5.864s + 1934}.$$

In some embodiments, the continuous time transfer function $H(s)$ can be converted into a discrete time transfer function $H(z)$ using, for example, a bilinear transformation:

$$H(z) = H(s)|_{s=\frac{2z-1}{Tz+1}}.$$

Alternatively, other methods of transforming $H(s)$ to $H(z)$ known in the art may be used. In the specific numerical example given above, $H(z)$ can be expressed as follows:

$$H(z) = K\frac{z^2 - 1.0075z + 0.5563}{z^2 - 1.205z + 0.8893}.$$

To find K, the DC gain of $H(z)$ is matched to the DC gain of $H(s)$, which is zero, yielding:

$$K\frac{1 - 1.0075 + 0.5563}{1 - 1.205 + 0.8893} = 1,$$

thus K=1.2467. Substituting for K, $H(z)$ can be written in the following form:

$$H(z) = \frac{A_0 z^2 - A_1 z + A_2}{z^2 - B_1 z + B_2},$$

where $A_0=1.2467$, $A_1=1.256$, $A_2=0.6935$, $B_1=1.205$ and $B_2=0.8893$. It should be appreciated the expressions for $H(s)$ and $H(z)$ represent just one of many possible numerical examples of embodiment filters. In alternative embodiments, other filter parameters and transfer functions may be used.

In alternative embodiments, the coefficients of discrete time transfer function $H(z)$ can be determined directly in the z domain using digital filter design methods known in the art. In various embodiments, discrete time transfer function $H(z)$ may be implemented in active lateral shuffle filter 444 using recursive or Infinite Impulse Response (IRR) filter structures known in the art. In further embodiments, other digital filter structures may be used.

It should be appreciated that the values for $\omega$, $v$, $d$ and $T$ listed above represent just one example of many possible embodiment filter parameter sets. In alternative embodiments, different values may be used. During operation of the rotorcraft, the frequency of the lateral vibrations of the tail section may vary according to flight conditions, atmospheric conditions and load being carried by the rotorcraft. Accordingly, frequency co, the desired notch width or passband width $v$, and depth d may be selected such that the lateral shuffle frequency falls within the filters notch or passband over most flight conditions. In some embodiments, a bandpass filter function may be achieved by setting d to a value that is greater than one.

Figure 6:
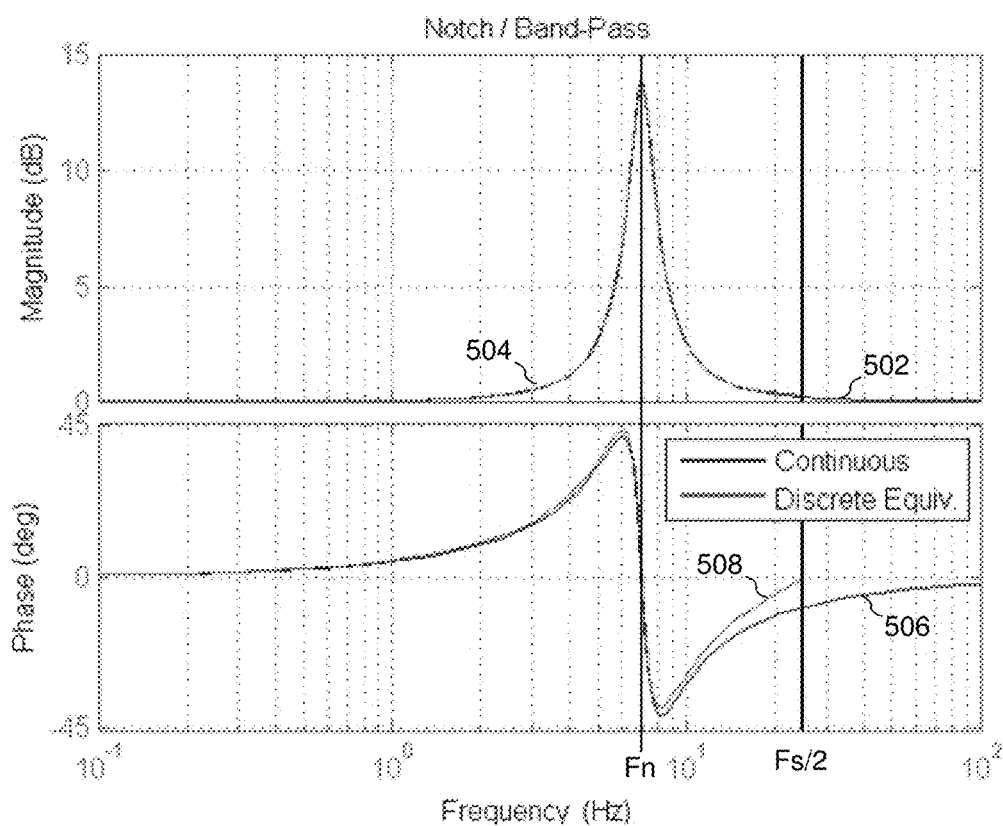
FIG. 6 illustrates a graph showing a frequency response of an embodiment active lateral shuffle filter.

FIG. 6 illustrates a frequency response plot of $H(s)$ and $H(z)$. Traces 502 and 504 represent the amplitude response of $H(s)$ and $H(z)$, respectively, and traces 506 and 508 represent the phase response of $H(s)$ and $H(z)$, respectively. As shown, amplitude response 504 and phase response 508 of $H(z)$ extend to one-half the sampling rate Fs/2, while amplitude response 502 and phase response 506 of $H(s)$ extend to the end of the plot. As shown, the amplitude response 502 of $H(s)$ matches the amplitude response 504 of $H(z)$ up to Fs/2, while the phase response 506 of $H(s)$ diverges from the phase response 508 of $H(z)$ at higher frequencies. This divergence at higher frequencies is an artifact of the transformation used to convert continuous time transfer function $H(s)$ to discrete time transfer function $H(z)$. The center frequency Fn of the bandpass response is about Fs=7 Hz and the peak gain of the bandpass response is about 14 dB. It should be understood that the transfer function discussed above and illustrated in FIG. 6 is just one of many possible transfer functions that could be used in embodiment lateral shuffle filters. In alternative embodiments, the lateral shuffle filter may have a different center frequency, depth, sampling rate and bandwidth and/or filter order.

Figure 7:
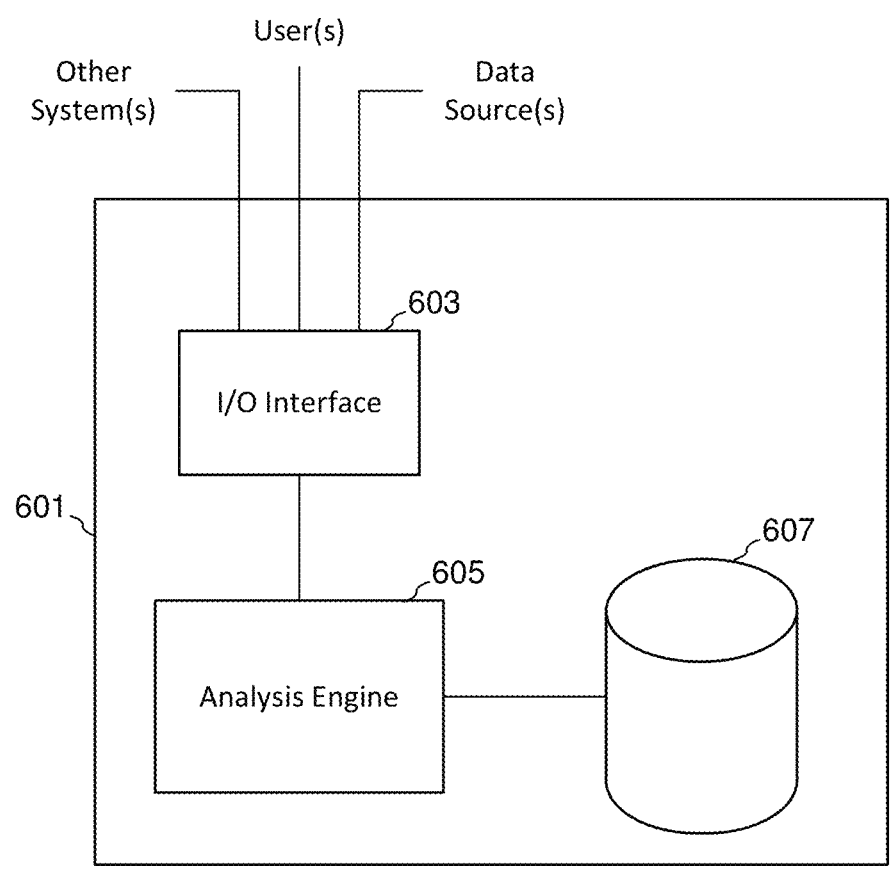
FIG. 7 illustrates a computer system that may be used to implement embodiment control algorithms.

FIG. 7 illustrates a computer system 601. The computer system 601 can be configured for performing one or more functions with regard to the operation of the flight control system 201, as described herein. Further, any processing and analysis can be partly or fully performed by the computer system 601. The computer system 601 can be partly or fully integrated with other aircraft computer systems or can be partly or fully removed from the rotorcraft.

The computer system 601 can include an input/output (I/O) interface 603, an analysis engine 605, and a database 607. Alternative embodiments can combine or distribute the I/O interface 603, the analysis engine 605, and the database 607, as desired. Embodiments of the computer system 601 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 603 can provide a communication link between external users, systems, and data sources and components of the computer system 601. The I/O interface 603 can be configured for allowing one or more users to input information to the computer system 601 via any known input device. Examples can include a keyboard, mouse, touch screen, and/or any other desired input device. The I/O interface 603 can be configured for allowing one or more users to receive information output from the computer system 601 via any known output device. Examples can include a display monitor, a printer, cockpit display, and/or any other desired output device. The I/O interface 603 can be configured for allowing other systems to communicate with the computer system 601. For example, the I/O interface 603 can allow one or more remote computer(s) to access information, input information, and/or remotely instruct the computer system 601 to perform one or more of the tasks described herein. The I/O interface 603 can be configured for allowing communication with one or more remote data sources. For example, the I/O interface 603 can allow one or more remote data source(s) to access information, input information, and/or remotely instruct the computer system 601 to perform one or more of the tasks described herein.

The database 607 provides persistent data storage for the computer system 601. Although the term "database" is primarily used, a memory or other suitable data storage arrangement may provide the functionality of the database 607. In alternative embodiments, the database 607 can be integral to or separate from the computer system 601 and can operate on one or more computers. The database 607 preferably provides non-volatile data storage for any information suitable to support the operation of the flight control system 201 and the method 500, including various types of data discussed further herein. The analysis engine 605 can include various combinations of one or more processors, memories, and software components.

Embodiments of the present invention are summarized here. Other embodiments can also be understood from the entirety of the specification and the claims filed herein. One general aspect includes a method of operating a rotorcraft including: receiving a measured yaw rate from a yaw rate sensor or a measured lateral acceleration from a lateral acceleration sensor of the rotorcraft; filtering the measured yaw rate or the measured lateral acceleration using a filter to form a filtered measured yaw rate or a filtered measured lateral acceleration, where the filter includes a bandpass characteristic or a notch characteristic, and where the filtering is configured to reduce lateral vibrations caused by airflow in a tail section of the rotorcraft; and regulating a yaw rate or a lateral acceleration of the rotorcraft based on the filtered measured yaw rate or the filtered measured lateral acceleration.

Implementations may include one or more of the following features. The method further including: receiving filter specification parameters from a test interface device; calculating filter coefficients based on the received filter specification parameters; and configuring the filter according to the received filter specification parameters. In some embodiments, the filter includes a second-order discrete-time filter. The second-order discrete-time filter may include a transfer function of:

$$H(z) = \frac{A_0 z^2 - A_1 z + A_2}{z^2 - B_1 z + B_2},$$

where $A_0$, $A_1$, $A_2$, $B_1$ and $B_2$ are filter constants. In some embodiments, the transfer function has a unity dc gain.

Regulating the yaw rate of the rotorcraft may include calculating a yaw rate error signal based on a yaw rate command and the filtered measured yaw rate; and providing an actuator signal to a tail rotor of the rotorcraft, where the actuator signal is based on the yaw rate error signal. The method may further include receiving the yaw rate command from a pilot control assembly. In some embodiments, the method further includes regulating the lateral acceleration of the rotorcraft comprises producing yaw rate command based on the filtered measured lateral acceleration, and providing an actuator signal to a tail rotor of the rotorcraft, wherein the actuator signal is based on the filtered measured lateral acceleration.

Another general aspect includes a flight control system for a rotorcraft including: a processor and a non-transitory computer readable storage medium with an executable program stored thereon. The executable program includes instructions to receive a measured yaw rate from a yaw rate sensor of the rotorcraft or receive a measured lateral acceleration from a lateral acceleration sensor of the rotorcraft, filter the measured yaw rate or the measured lateral acceleration using a discrete-time filter to form a filtered measured yaw rate or a filtered measured lateral acceleration, and provide an actuator signal to a tail rotor of the rotorcraft based on the filtered measured yaw rate or the filtered measured lateral acceleration. The discrete-time filter includes a bandpass or notch characteristic, and the discrete-time filter is configured to attenuate a lateral vibration caused by airflow in a tail section of the rotorcraft.

Implementations may include one or more of the following features. The flight control system where the executable program is further configured to: receive filter specification parameters from a test interface device; calculate filter coefficients based on the received filter specification parameters; and configure the discrete-time filter according to the received filter specification parameters. The filter specification parameters may include: a center frequency of the bandpass characteristic or notch characteristic; a width of the bandpass characteristic or notch characteristic; and a depth of the bandpass characteristic or notch characteristic.

In an embodiment, the discrete-time filter includes a transfer function of: transfer function of:

$$H(z) = \frac{A_0 z^2 - A_1 z + A_2}{z^2 - B_1 z + B_2},$$

where $A_0$, $A_1$, $A_2$, $B_1$ and $B_2$ are filter constants. The executable program may be configured to regulate the yaw rate of the rotorcraft by calculating a yaw rate error signal based on a yaw rate command and the filtered measured yaw rate. The yaw rate sensor may include an inertial sensor.

A further general aspect includes a rotorcraft including: a body; a power train coupled to the body and including a power source and a drive shaft coupled to the power source; a main rotor system coupled to the power train and including a plurality of mail rotor blades; a tail rotor system coupled to the power train and including a plurality of tail rotor blades; an inertial sensor; a flight control system operable to change at least one operating condition of the main rotor system and at least one operating condition of the tail rotor system; a pilot control assembly configured to receive commands from a pilot, where the flight control system is a fly-by-wire flight control system in electrical communication with the pilot control assembly; and a flight control computer in electrical communication between the flight control system and the pilot control assembly. The flight control computer is configured to: receive a measured yaw rate or a measured lateral acceleration from the inertial sensor, filter the measured yaw rate or the measured lateral acceleration using a bandpass filter or a notch filter to form a filtered measured yaw rate or a filtered measured lateral acceleration, where a lateral vibration frequency of the rotorcraft caused by airflow in a tail section of the rotorcraft is within a passband of the bandpass filter or within a stopband of the notch filter, and regulate a yaw rate of the rotorcraft based on the filtered measured yaw rate or the filtered measured lateral acceleration.

Implementations may include one or more of the following features. The rotorcraft where the flight control computer is configured to regulate the yaw rate of the rotorcraft by calculating a yaw rate error signal based on a yaw rate command and the filtered measured yaw rate. The flight control computer may be further configured to regulate the yaw rate of the rotorcraft providing an actuator signal to an actuator of the tail rotor system, where the actuator signal is based on yaw rate error signal. The bandpass filter or notch filter may include a second-order discrete-time filter.

In an embodiment, a lateral shuffle frequency of the rotorcraft is within a passband of the bandpass filter or within a stopband of the notch filter. The rotorcraft may further include a flight test interface device coupled to the flight control computer, where the flight control computer is further configured to receive filter specification parameters from the flight test interface device; calculate filter coefficients based on the received filter specification parameters; and configure the bandpass filter or a notch filter according to the received filter specification parameters.

Advantages of embodiments include the ability to use a fly-by-wire system to suppress mechanical vibrations without having to add extra stability structure to the aircraft that would add extra weight and drag.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of operating a rotorcraft, the method comprising:
   receiving a measured yaw rate from a yaw rate sensor or a measured lateral acceleration from a lateral acceleration sensor of the rotorcraft;
   filtering the measured yaw rate or the measured lateral acceleration using a filter to form a filtered measured yaw rate or filtered measured lateral acceleration, wherein the filter comprises a bandpass characteristic or a notch characteristic, and the filtering is configured to reduce lateral vibrations caused by airflow in a tail section of the rotorcraft; and
   regulating a yaw rate or a lateral acceleration of the rotorcraft based on the filtered measured yaw rate or the filtered measured lateral acceleration by providing an actuator signal to a tail rotor of the rotorcraft, wherein the tail rotor comprises a plurality of tail rotor blades, the actuator signal is based on the filtered measured yaw rate or the filtered measured lateral acceleration, and the actuator signal controls a pitch of the plurality of tail rotor blades.

2. The method of claim 1, wherein:
   the filter comprises the notch characteristic; and
   a frequency of the measured yaw rate or filtered measured lateral acceleration is within a stopband of the notch characteristic.

3. The method of claim 1, further comprising:
   receiving filter specification parameters from a test interface device;
   calculating filter coefficients based on the received filter specification parameters; and
   configuring the filter according to the received filter specification parameters.

4. The method of claim 1, wherein the filter comprises a second-order discrete-time filter.

5. The method of claim 4, wherein the second-order discrete-time filter comprises a transfer function of:

$$H(z) = \frac{A_0 z^2 - A_1 z + A_2}{z^2 - B_1 z + B_2},$$

where $A_0$, $A_1$, $A_2$, $B_1$ and $B_2$ are filter constants.

6. The method of claim 5, wherein the transfer function has a unity DC gain.

7. The method of claim 1, wherein:
   regulating the yaw rate of the rotorcraft comprises calculating a yaw rate error signal based on a yaw rate command and the filtered measured yaw rate; and
   the actuator signal is based on the yaw rate error signal.

8. The method of claim 7, further comprising receiving the yaw rate command from a pilot control assembly.

9. The method of claim 1, wherein:
regulating the lateral acceleration of the rotorcraft comprises producing yaw rate command based on the filtered measured lateral acceleration; and
the actuator signal is based on the filtered measured lateral acceleration.

10. A flight control system for a rotorcraft comprising:
a processor and a non-transitory computer readable storage medium with an executable program stored thereon, the executable program including instructions to
receive a measured yaw rate from a yaw rate sensor of the rotorcraft or receive a measured lateral acceleration from a lateral acceleration sensor of the rotorcraft,
filter the measured yaw rate or the measured lateral acceleration using a discrete-time filter to form a filtered measured yaw rate or a filtered measured lateral acceleration, wherein the discrete-time filter comprises a bandpass or notch characteristic, and the discrete-time filter is configured to attenuate a lateral vibration caused by airflow in a tail section of the rotorcraft, and
provide an actuator signal to a tail rotor of the rotorcraft based on the filtered measured yaw rate or the filtered measured lateral acceleration, wherein the tail rotor comprises a plurality of tail rotor blades, and the actuator signal controls a pitch of the plurality of tail rotor blades.

11. The flight control system of claim 10, wherein the executable program is further configured to:
receive filter specification parameters from a test interface device;
calculate filter coefficients based on the received filter specification parameters; and
configure the discrete-time filter according to the received filter specification parameters.

12. The flight control system of claim 11, wherein the filter specification parameters comprise:
a center frequency of the bandpass characteristic or notch characteristic;
a width of the bandpass characteristic or notch characteristic; and
a depth of the bandpass characteristic or notch characteristic.

13. The flight control system of claim 10, wherein the discrete-time filter comprises a transfer function of:

$$H(z) = \frac{A_0 z^2 - A_1 z + A_2}{z^2 - B_1 z + B_2},$$

where A0, A1, A2, B1 and B2 are filter constants.

14. The flight control system of claim 10, wherein the executable program is configured to regulate the yaw rate of the rotorcraft by calculating a yaw rate error signal based on a yaw rate command and the filtered measured yaw rate.

15. The flight control system of claim 10, wherein the yaw rate sensor comprises an inertial sensor.

16. A rotorcraft comprising:
a body;
a power train coupled to the body and comprising a power source and a drive shaft coupled to the power source;
a main rotor system coupled to the power train and comprising a plurality of main rotor blades;
a tail rotor system coupled to the power train and comprising a plurality of tail rotor blades;
an inertial sensor;
a flight control system operable to change at least one operating condition of the main rotor system and at least one operating condition of the tail rotor system;
a pilot control assembly configured to receive commands from a pilot, wherein the flight control system is a fly-by-wire flight control system in electrical communication with the pilot control assembly; and
a flight control computer in electrical communication between the flight control system and the pilot control assembly, the flight control computer configured to:
receive a measured yaw rate or a measured lateral acceleration from the inertial sensor,
filter the measured yaw rate or the measured lateral acceleration using a bandpass filter or a notch filter to form a filtered measured yaw rate or a filtered measured lateral acceleration, wherein a lateral vibration frequency of the rotorcraft caused by airflow in a tail section of the rotorcraft is within a passband of the bandpass filter or within a stopband of the notch filter, and
regulate a yaw rate of the rotorcraft based on the filtered measured yaw rate or the filtered measured lateral acceleration by providing an actuator signal to an actuator of the tail rotor system, wherein the actuator signal is based on the filtered measured yaw rate or the filtered measured lateral acceleration, and the actuator signal controls a pitch of the plurality of tail rotor blades.

17. The rotorcraft of claim 16, wherein the flight control computer is configured to regulate the yaw rate of the rotorcraft by calculating a yaw rate error signal based on a yaw rate command and the filtered measured yaw rate.

18. The rotorcraft of claim 17, wherein the actuator signal is based on yaw rate error signal.

19. The rotorcraft of claim 16, wherein the bandpass filter or notch filter comprises a second-order discrete-time filter.

20. The rotorcraft of claim 16, wherein the flight control computer is configured to filter the measured lateral acceleration using the notch filter.

21. The rotorcraft of claim 16, further comprising a flight test interface device coupled to the flight control computer, wherein the flight control computer is further configured to
receive filter specification parameters from the flight test interface device;
calculate filter coefficients based on the received filter specification parameters; and
configure the bandpass filter or the notch filter according to the received filter specification parameters.

* * * * *